(12) United States Patent
Bourget et al.

(10) Patent No.: US 8,863,694 B2
(45) Date of Patent: Oct. 21, 2014

(54) UPGRADEABLE CONTROL SYSTEM FOR AQUARIUM LIGHTING

(75) Inventors: Christopher Michael Bourget, Fitchburg, WI (US); Ronald J. Anderson, Fitchburg, WI (US); Barry Arneson, Madison, WI (US)

(73) Assignee: Orbital Technologies Corporation, Madison, WI (US)

( * ) Notice: Subject to any disclaimer, the term of this patent is extended or adjusted under 35 U.S.C. 154(b) by 255 days.

(21) Appl. No.: 13/238,637

(22) Filed: Sep. 21, 2011

(65) Prior Publication Data
US 2012/0152177 A1     Jun. 21, 2012

Related U.S. Application Data

(60) Provisional application No. 61/384,866, filed on Sep. 21, 2010.

(51) Int. Cl.
    *A01K 63/06*       (2006.01)
    *H05B 37/02*       (2006.01)
    *F21W 131/308*     (2006.01)
(52) U.S. Cl.
    CPC .............. *A01K 63/06* (2013.01); *H05B 37/029* (2013.01); *F21W 2131/308* (2013.01)
    USPC .......................................... 119/267; 119/266
(58) Field of Classification Search
    CPC   A01K 63/06; F21W 2131/308; H05B 37/029
    USPC .......... 119/265, 266, 267, 269, 247; 362/101, 362/253, 85, 217.01, 217.02–217.09, 221, 362/646, 217.17, 219
    See application file for complete search history.

(56) References Cited

U.S. PATENT DOCUMENTS

| | | | | |
|---|---|---|---|---|
| 5,165,778 A * | 11/1992 | Matthias et al. | ............... | 362/101 |
| 7,220,018 B2 * | 5/2007 | Crabb et al. | ................... | 362/234 |
| 2004/0036424 A1 * | 2/2004 | Hsieh | ............................. | 315/291 |
| 2006/0167572 A1 * | 7/2006 | Fluss | ................................ | 700/83 |
| 2008/0218995 A1 * | 9/2008 | Gilkey et al. | ................. | 362/101 |
| 2013/0186346 A1 * | 7/2013 | Milford et al. | ................. | 119/247 |

* cited by examiner

*Primary Examiner* — Rob Swiatek
*Assistant Examiner* — Ebony Evans
(74) *Attorney, Agent, or Firm* — Dorsey & Whitney LLP

(57) ABSTRACT

An LED-based aquarium lighting system having upgradeable control system and a method thereof are provided. The system includes an LED source having a plurality of LED lights, a marine habitat for housing a marine habitat life, a control system which comprises a motherboard, a control panel, and a control module. The control module is replaceable with a new control module to provide upgrades of operational modes and features of the aquarium lighting system. Accordingly, to perform an upgrade of the control system, a user replaces the control module with a new control module by removing the control module from the motherboard and plugging the new control module in the motherboard, thereby readily making upgrades of operational modes and features of the aquarium lighting system without requiring the entire aquarium lighting system be replaced.

7 Claims, 3 Drawing Sheets

UPGRADEABLE CONTROL SYSTEM FOR AQUARIUM LIGHTING

CROSS-REFERENCE TO RELATED APPLICATION(S)

This patent application claims priority to the provisional patent application entitled "UPGRADEABLE CONTROL SYSTEM FOR AQUARIUM LIGHTING", U.S. Patent Application No. 61/384,866, filed Sep. 21, 2010, which are incorporated herein by reference in its entirety.

FIELD OF THE INVENTION

The present invention relates generally to control systems and methods for aquarium lighting. More particularly, the present invention relates to upgradeable control systems and methods for LED-based aquarium lighting for plants and/or animal habitat, marine life, etc.

BACKGROUND OF THE INVENTION

There are LED-based lighting systems currently available that promote growth for plants and/or animal habitat, marine life, etc. These LED-based lighting systems include an LED source offering spatial control of spectral output which can allow a user-defined or preprogrammed appropriate spectrum for growth of specific marine plant and animal life. Though these lighting systems are satisfactory for their designed applications, there is a need for a marine lighting system that can be upgraded such that the system allows a user to readily add new or different operational modes and features to the system or upgrade the system by replacing a single piece or part of a control system, without requiring an entire lighting system to be returned to a manufacturer or point of sale.

SUMMARY OF THE INVENTION

The present invention provides an LED-based lighting system that is upgradeable such that the system allows a user to readily add new or different operational modes and features to the system or upgrade the system by replacing a single piece or part of a control system, e.g. a control module, without requiring an entire lighting system to be returned to a manufacturer or point of sale. In particular, the present invention provides a specialized user-upgradeable control system that is designed for a full-tank type LED-based aquarium lighting system. It will be appreciated that such user-upgradeable control system can be configured and/or arranged in the other types of LED-based aquarium lighting systems without departing from the scope or spirits of the present invention.

In one embodiment of the present invention, an LED-based aquarium lighting system includes an LED source, a marine habitat, and a control system which comprises a motherboard, a control panel, and a control module, wherein the control module can be replaced with a new control module, or in another embodiment, at least one additional control module can be added and coupled to the motherboard. The control module and/or the at least one additional control module provide new or different operational modes and features to the system.

Further in one embodiment of the present invention, the motherboard may include a user display and a plurality of connectors to link the control modules and the control panel. The motherboard provides an interface between control modules and the LED source which may include a plurality of LED lights. Accordingly, the motherboard is the heart of the control system and serves as a central connection point to all other system components.

Still in one embodiment of the present invention, the control panel is a separate unit that plugs into the motherboard. The control panel, along with the user display on the motherboard, comprises a user interface for the aquarium lighting system. The control panel contains a number of buttons or button-type functions that are used to change settings, modes, and features of the lighting system, and feedback to the user is provided by the user display, for example, a motherboard-mounted display. The motherboard may be installed into a lighting fixture such that the display is visible to the user.

Additionally in one embodiment of the present invention, the control module is a separate circuit board that plugs into the motherboard via an edge connector. The control software and hardware (i.e. the system microprocessor) are contained on the control module. Operations of all the lighting system are defined by the software which is installed on the control module. The control module is designed to be easily removable by the end user. Accordingly, to upgrade the lighting system, the user removes the existing control module and installs a new control module with different software in its place.

BRIEF DESCRIPTION OF THE DRAWINGS OF THE INVENTION

DETAILED DESCRIPTION

The present invention relates generally to control systems and methods for aquarium lighting. More particularly, the present invention relates to upgradeable control systems and methods for LED-based aquarium lighting for plants and/or animal habitat, marine life, etc.

Figure 1:
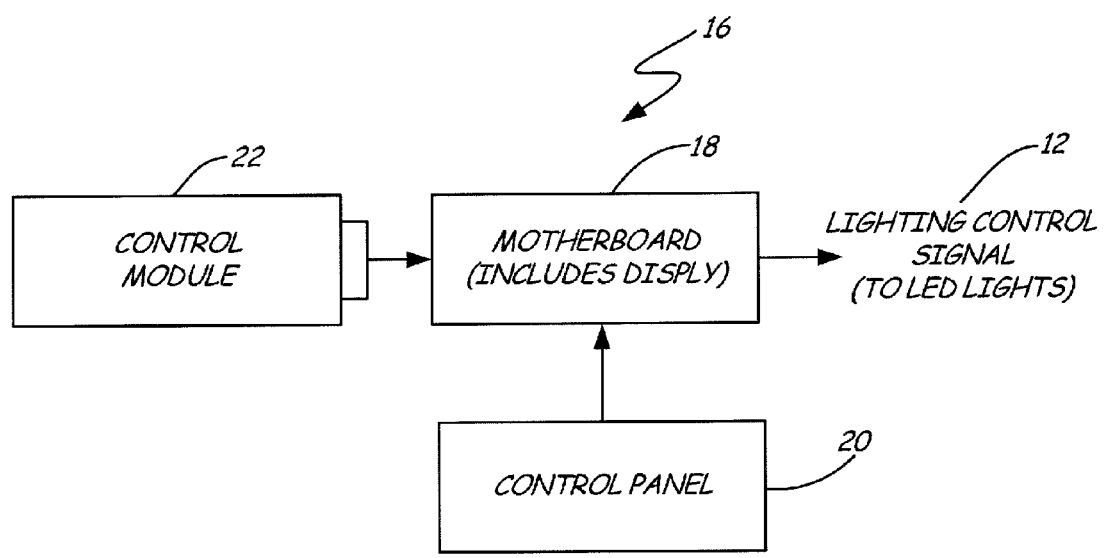
FIG. 1 is a block diagram of one embodiment of an upgradeable control system for an LED-based aquarium lighting system in accordance with the principles of the present invention.
Figure 2:
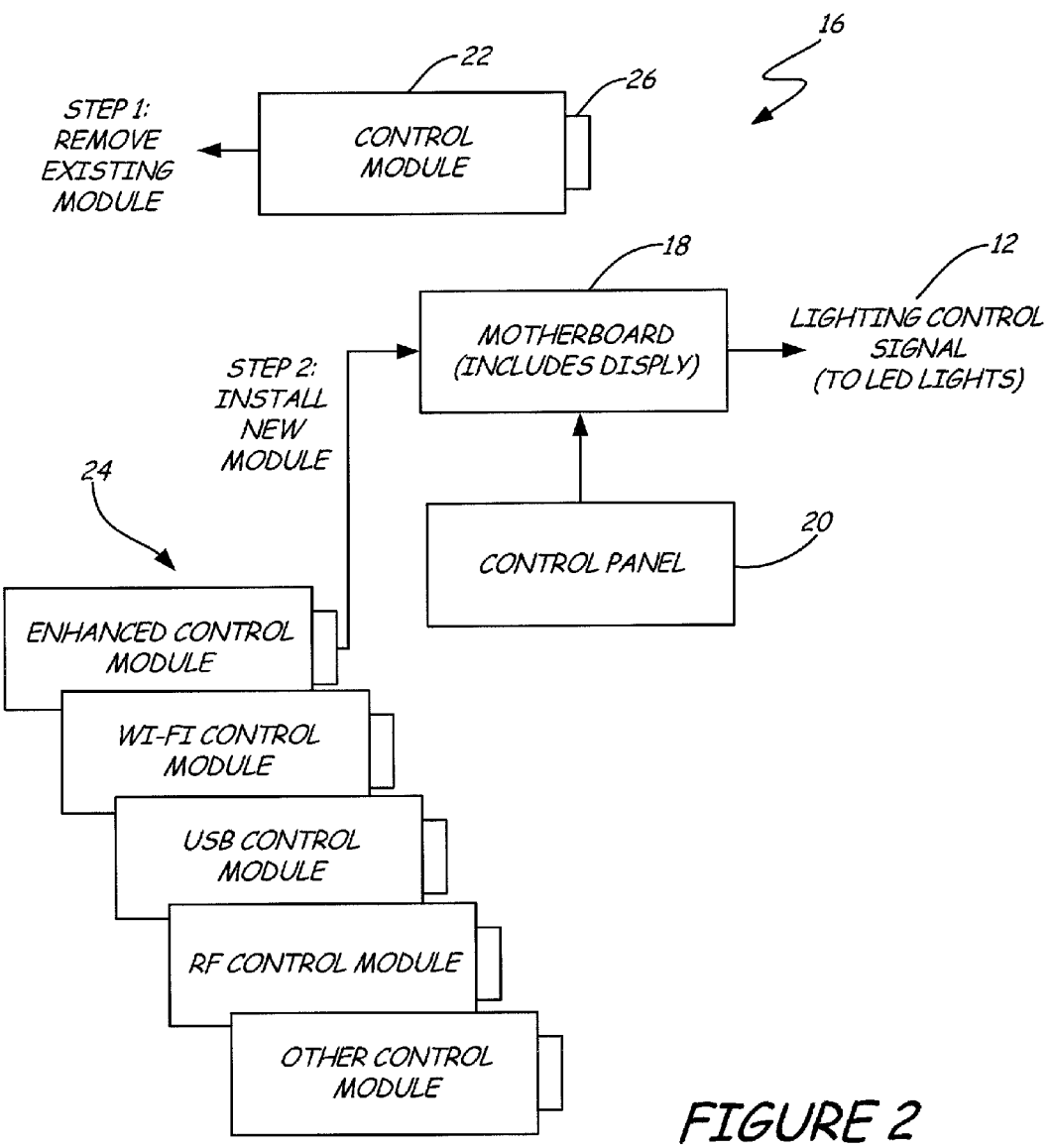
FIG. 2 is a block diagram illustrating one embodiment of a process of upgrading a control module of an LED-based aquarium lighting system in accordance with the principles of the present invention.
Figure 3:
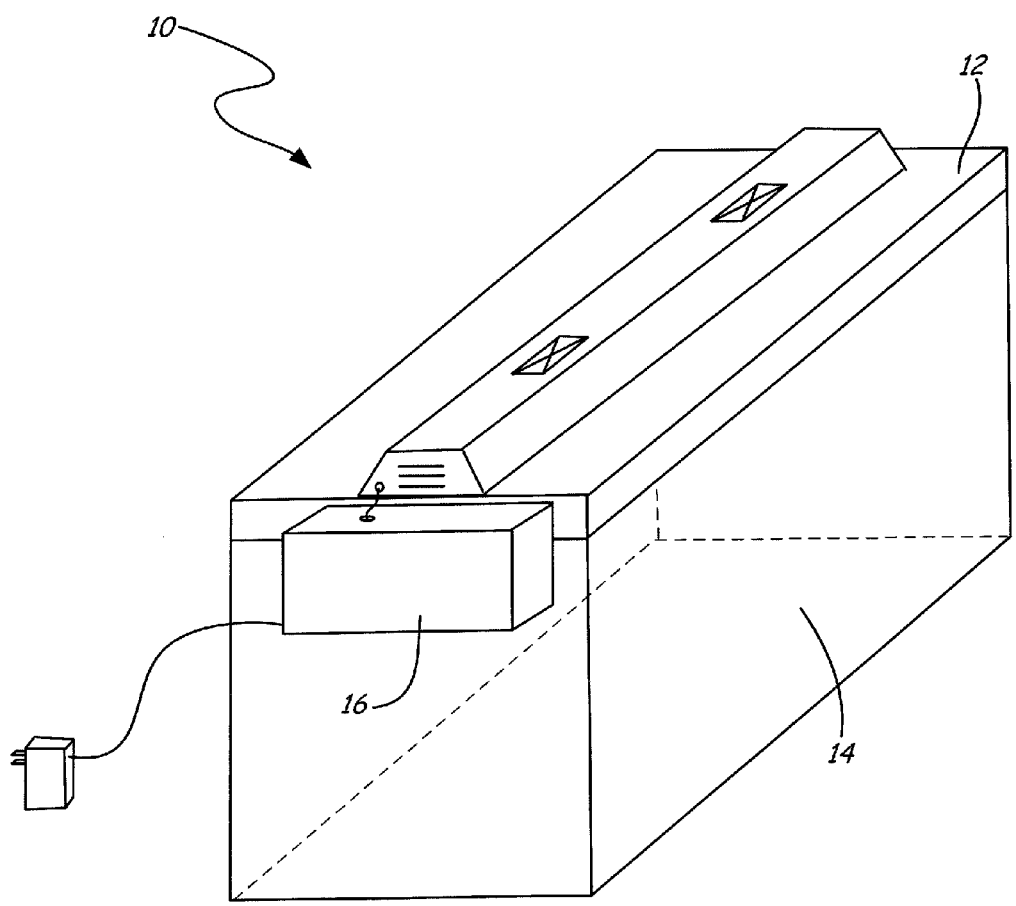
FIG. 3 illustrates one embodiment of an LED-based aquarium lighting system.

FIGS. 1-3 illustrate an LED-based aquarium lighting system 10 (see FIG. 3) which includes an LED source 12, a marine habitat 14, and a control system 16. The control system 16 comprises a motherboard 18, a control panel 20, and a control module 22 (see FIGS. 1 and 2). As shown in FIG. 2, the control module 22 can be replaced with a new control module 24, or in another embodiment, at least one additional control module 24 can be added and coupled to the motherboard 18. The control module 22 and/or the at least one additional control module 24 provide new or different operational modes and features to the system 16.

As shown in FIGS. 2-3, the motherboard 18 may include a user display (LCD) and a plurality of connectors to link the control modules 22, 24 and the control panel 20. The motherboard 18 provides an interface between control modules 22, 24 and the LED source 12 which may include a plurality of LED lights. Accordingly, the motherboard 18 is the heart of the control system 16 and serves as a central connection point to all other system components.

The control panel 20 is a separate unit that plugs into the motherboard 18. The control panel 20, along with the user display on the motherboard 18, comprises a user interface for the aquarium lighting system 10. The control panel 20 contains a number of buttons or button-type functions that are used to change settings, modes, and features of the lighting system 10, and feedback to the user is provided by the user display, for example, a motherboard-mounted display. The motherboard 18 may be installed into a lighting fixture of the LED source 12 such that the display is visible to the user.

The control module 22, 24 is a separate circuit board that plugs into the motherboard 18 via an edge connector 26. The control software and hardware (i.e. the system microprocessor) are contained on the control module 22. Operations of all the lighting system 10 are defined by the software which is installed on the control module 22, 24. The control module 22, 24 is designed to be easily removable by the end user. Accordingly, to upgrade the lighting system 10, the user removes the existing control module 22 and installs a new control module 24 with different software in its place.

In FIG. 2, the control system 16 allows several different types of upgrades, some of which are shown, but not limited to those shown in FIG. 2. The most basic upgrade may be a software (feature set) upgrade. For example, if a user desires to upgrade to the newer version of the control software (with added features, such as user controlled colors, moonlight cycles, etc), the user may purchase and install a new control module 24 with the appropriate software installed. In this case, the control system configuration, e.g. the physical hardware, is the same, i.e. only the software is changed. One of the advantages of the present invention is that this design also allows much more substantial upgrades to be installed. For example, the control module 16 may be replaced with a new control module 24 that contains a wireless transceiver in addition to the microprocessor. Depending on the hardware on the new module 24, the user may then control the lighting system 10 via a handheld remote control, home computer, or even remotely via the Internet over the user's home wireless network. Since the interface between the control module 22, 24 and the motherboard 18 does not change, any number of different communications protocols may be added to future control modules, including but not limited to, RS232, USB, WiFi, Bluetooth, etc.

One advantage of the present invention is that the system is designed so that a user may easily perform the upgrade, without requiring an entire lighting system to be returned to a manufacturer or point of sale.

Further, it is appreciated that other types of control modules can be designed to upgrade existing control modules and installed in a control system provided in the present invention, rather than requiring an end user to buy a completely new lighting system.

These and other features of the present invention will become apparent to those skilled in the art. As it will be realized, the present invention is capable of modifications in various obvious aspects, all without departing from the spirit and scope of the present invention.

The invention claimed is:

1. An LED-based aquarium lighting system, comprising:
an LED light source having a plurality of LED lights;
a marine habitat configured for housing marine life; and
a control system which comprises a motherboard including a user display, a control panel, and a control module;
wherein the control module is replaceable with a new control module to provide upgrades of operational modes and features of the aquarium lighting system;
wherein the control panel is a separate unit that plugs into the motherboard, and wherein the control panel, along with the user display on the motherboard, comprises a user interface for a user of the aquarium lighting system; and
wherein the motherboard is disposed on the LED light source such that the user display is visible to the user.

2. The system of claim 1, wherein the motherboard includes a plurality of connectors to link the control module and the control panel, and wherein the motherboard provides an interface between the control module and the LED light source.

3. The system of claim 1, wherein the control panel provides means for changing settings, modes, and features of the aquarium lighting system, and for providing feedback to the user.

4. The system of claim 1, wherein the control module is a separate circuit board that plugs into the motherboard via an edge connector.

5. A control system for an LED-based aquarium lighting system, comprising an LED light source having a plurality of LED lights and a marine habitat configured for housing marine life, the control system comprising:
a motherboard having a user display, a control panel, and an upgradeable control module;
wherein the upgradeable control module is replaceable with a new control module to provide upgrades of operational modes and features of the aquarium lighting system;
wherein the upgradeable control panel is a separate unit that plugs into the motherboard, and wherein the upgradeable control panel, along with the user display on the motherboard, comprises a user interface for a user of the aquarium lighting system; and
wherein the motherboard is disposed on the LED light source such that the user display is visible to the user;
the control panel having means for changing settings, modes, and features of the LED-based lighting system, and for providing feedback to a user; and
wherein the upgradeable control module can be removed and replaced by the new control module, the new control module being a separate circuit board that plugs into the motherboard via an edge connector.

6. The system of claim 5, wherein the motherboard further includes a plurality of connectors to link the control module and the control panel, and wherein the motherboard provides an interface between the control module and the LED light source of the LED-based aquarium lighting system.

7. A method of aquarium lighting with the LED-based aquarium lighting system of claim 1, the method comprising:
providing the LED-based aquarium lighting system, comprising the LED light source having a plurality of LED lights, and the marine habitat configured for housing marine life;
providing the control system which comprises the motherboard including the user display, the control panel, and the control module, wherein the control module and the control panel are connected to the motherboard;
providing aquarium lighting in an operational mode of the control system, to the marine life in the marine habitat; and
replacing the control module with the new control module by removing the control module from the motherboard and plugging the new control module into the motherboard, wherein upgrades of the operational mode and features of the LED-based aquarium lighting system are made without requiring the entire LED-based aquarium lighting system be replaced.

* * * * *